United States Patent [19]
Dixon

[11] 3,714,247
[45] Jan. 30, 1973

[54] IMIDOYLBENZENESULFONAMIDES

[75] Inventor: William D. Dixon, Kirkwood, Mo.

[73] Assignee: Monsanto Company, St. Louis, Mo.

[22] Filed: Dec. 11, 1970

[21] Appl. No.: 97,371

[52] U.S. Cl. .............................. 260/556 AR, 71/103
[51] Int. Cl. ............................................. C07c 143/84
[58] Field of Search .............................. 260/556 AR

[56] References Cited

FOREIGN PATENTS OR APPLICATIONS 839,493   5/1952   Germany ...................... 260/556 AR Primary Examiner—Norma S. Milestone
Assistant Examiner—G. Thomas Todd
Attorney—Neal E. Willis, Paul C. Krizov and Harold M. Dixon

[57] ABSTRACT

The new compounds of this invention are of the formula

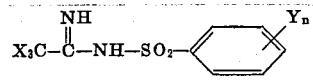

where X is independently selected from hydrogen and halogen, with the proviso that X cannot represent more than one iodine; Y is independently selected from hydrogen, halogen, alkyl, haloalkyl of not more than 12 carbon atoms with not more than 3 halogens therein in the 1- and 2-position, and alkoxy of not more than five carbon atoms, and $n$ is an integer of 1 through 5. These compounds are useful as herbicides and in controlling the growth of plants.

12 Claims, No Drawings

IMIDOYLBENZENESULFONAMIDES

This invention relates to new imidoylbenzenesulfonamides. These new compounds are useful in controlling the growth of plants.

The new compounds of this invention are of the formula

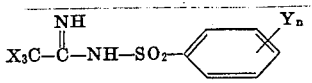

where X is independently selected from hydrogen and halogen, with the proviso that X cannot represent more than one iodine; Y is independently selected from hydrogen, halogen, alkyl, haloalkyl of not more than 12 carbon atoms with not more than 3 halogens therein in the 1- and 2-position, and alkoxy of not more than five carbon atoms, and $n$ is an integer of 1 through 5.

Preferred compounds are wherein at least one X is hydrogen. Also preferred are where $n$ is an integer of 1 through 3 regardless of what Y is.

The halogens represented by X or Y are chlorine, bromine, fluorine and iodine with the proviso that not more than one X is iodine.

The alkyl radicals represented by Y can be straight or branched, primary, secondary or tertiary. Examples are methyl, ethyl, propyl, isopropyl, n-butyl, sec.butyl, isobutyl and tert.butyl, n-hexyl, isononyl, n-dodecyl and isododecyl. Preferably the alkyls have up to four carbon atoms therein.

Examples of haloalkyl radicals represented by Y are chloromethyl; trifluoromethyl; 2-bromoethyl; 1,1,2-trichloro-butyl; 1-chlorohexyl; and 1-chlorododecyl. Preferably the haloalkyls have up to four carbon atoms therein.

Examples of alkoxy radicals represented by Y are methoxy, propoxy, and amyloxy. Preferably the alkoxyls have up to four carbon atoms therein.

Illustrative examples of the imidoylbenzenesulfonamides are:

N-acetimidoylbenzenesulfonamide
N-acetimidoyl-2-methylbenzenesulfonamide
N-acetimidoyl-3-tert.butylbenzenesulfonamide
N-acetimidoyl-4-isododecylbenzenesulfonamide
N-acetimidoyl-2,4,6-trimethylbenzenesulfonamide
N-aetimidoyl-2-chlorobenzenesulfonamide
N-acetimidoyl-2-fluorobenzenesulfonamide
N-acetimidoyl-4-iodobenzenesulfonamide
N-acetimidoyl-2-fluoro-4-chlorobenzenesulfonamide
N-acetimidoyl-2,3,4,5,6-pentachlorobenzenesulfonamide
N-acetimidoyl-2-trifluoromethylbenzenesulfonamide
N-acetimidoyl-3-(alpha,alpha-dichloropropyl)-benzenesulfonamide
N-acetimidoyl-2-methoxybenzenesulfonamide
N-acetimidoyl-2,4,6-trimethoxybenzenesulfonamide
N-acetimidoyl-3-chloro-4-methoxybenzenesulfonamide
N-acetimidoyl-2-chloro-4-tert.butyl-6-methoxybenzenesulfonamide
N-acetimidoyl-2-chloro-4-trichloromethyl-6-methoxybenezenesulfonamide
N-acetimidoyl-4-chloro-2,5-dimethoxybenzenesulfonamide
N-(alpha-chloroacetimidoyl)benzenesulfonamide
N-(alpha-bromoacetimidoyl)-2-methylbenzenesulfonamide
N-(alpha-iodoacetimidoyl)-2-isopropylbenzenesulfonamide
N-(alpha-fluoroacetimidoyl)-3-tert.butylbenzenesulfonamide
N-(alpha,alpha,alpha-trichloroacetimidoyl)-4-isododecylbenzenesulfonamide
N-(alpha,alpha,alpha-trichloroacetimidoyl)-2,4,6-tri-isopropylbenzenesulfonamide
N-(alpha,alpha,alpha-trichloroacetimidoyl)-2-chlorobenzenesulfonamide
N-(alpha-chloroacetimidoyl)-4-fluorobenzenesulfonamide
N-(alpha-bromoacetimidoyl)-3-bromobenzenesulfonamide
N-(alpha-chloroacetimidoyl)-2-fluoro-4-chlorobenzenesulfonamide
N-(alpha,alpha,alpha-trichloroacetimidoyl)-2,4,6-trichlorobenzenesulfonamide The compounds of this invention can be prepared by reacting an acetamidine with a benzene sulfonyl chloride preferably in a temperature range of room temperature to reflux and at a preferred pressure of atmospheric in the presence of a base. Preferably the compounds containing an iodoacetimidoyl moiety are prepared by reacting a corresponding acetimidoylbenzenesulfonamide containing a different halogen with NaI in acetone at ambient conditions (i.e., about 20°C and 15 psi.). Although atmospheric pressure is preferred, pressures above and below atmospheric can be employed, although pressures below atmospheric pressure are not desirable. The ratio of the base, the acetamidine and the benzene sulfonyl chloride are preferably 1:1:1 when the acetamidine is in the free-amine form and if the acetamidine is in the form of a hydrohalide, then the three components are employed in a ratio of 2:1:1 respectively. In the latter case, 1 mole of the free base releases the acetamidine from the salt form and the other mole of the free base acts as an acid acceptor in the ensuing reaction as it does when the free-amidine itself is employed as the starting material. Solvents can be employed and the solvent is preferably an inert solvent which does not react with any of the ingredients present. The reaction and variation in details of the preparation in particular will be made clear by the detailed examples to follow:

EXAMPLE I

About 0.05 mole of 6.7 g. of trichloroacetamidine, about 0.05 mole or 5.0 g. of triethylamine and 200 ml. of $CHCl_3$ were placed in a four-necked flask equipped with a thermometer, stirrer, reflux condenser (using tap water) and a dropping funnel. About 0.05 mole of 8.9 g. of benzenesulfonyl chloride was added dropwise with stirring and the reaction was heated to reflux (it was not exothermic) for about 3 hours. The reaction mixture was allowed to cool and then 100 ml. of $H_2O$ were added. The $CHCl_3$ layer was separated and dried over $MgSO_4$ filtered and the filtrate evaporated to give a white solid. The white solid was recrystallized from benzene. The solid was dissolved in $CHCl_3$ and pentane was added until the solution became cloudy from solids formed. The solid was recovered and recrystallized from isopropanol. The elemental analysis was as follows:

| $C_8H_7Cl_3N_2O_2S$ | %C | %H | %Cl |
|---|---|---|---|
| Calculated: | 31.86 | 2.34 | 35.27 |
| Found: | 32.05 | 2.46 | 35.08 |

Nuclear magnetic resonance (NMR) spectral analysis confirmed the product, N-(alpha,alpha,alpha-trichloroacetimidoyl)-benzenesulfonamide.

EXAMPLE II

Using similar equipment as that employed in Example I, 0.1 mole or 9.5 g. of acetamidine hydrochloride, 0.1 mole or 24.6 g. of 3,4-dichlorobenzenesulfonyl chloride and 200 ml. of methylenechloride were placed in the flask. About 0.2 mole of NaOH was added dropwise with stirring in the form of 16 g. of 50 percent aqueous sodium hydroxide. The reaction was exothermic to reflux temperature and white solid formed in the reaction mixture. The reaction mixture was allowed to stir overnight. About 100 ml. of $H_2O$ were stirred in and the mixture was filtered. The filtrate was transferred to a separatory funnel. The methylene chloride layer was separated, dried over $MgSO_4$, filtered and evaporated to yield additional solid. The solids were combined and recrystallized from ethanol, then acetonitrile. The white solid recovered had a melting point of 154°–157°C. Elemental analysis was as follows:

| $C_8H_8Cl_2N_2O_2S$ | %C | %H | %N |
|---|---|---|---|
| Calculated: | 35.97 | 3.02 | 10.49 |
| Found: | 36.09 | 2.95 | 10.56 |

NMR spectral analysis confirmed the product N-acetimidoyl-3,4-dichlorobenzenesulfonamide.

As aforementioned, the compounds of this invention are useful in controlling the growth of plants. This utility will now be discussed and exemplified.

The term "herbicide" as used herein and in the appended claims means materials which control the growth of plants either (1) all plants in a given locus or (2) selectively control the growth of one or more plant species in the presence of other plants. In like manner, "herbicidalal" is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "herbicidal formulation or composition" as used herein means at least one compound of this invention in combination with an adjuvant.

EXAMPLE III

The pre-emergent herbicidal activity of the active ingredients of this invention is demonstrated as follows: A good grade of top soil is placed in aluminum pans and compacted to a depth of three-eighths to one-half inch from the top of each pan. A predetermined number of seeds of the test plant species are placed on top of the soil in the pans. The seeds are covered with a three-eighths inch layer of soil and the pan leveled. The active ingredient is applied by spraying it on the surface of the soil as a herbicidal formulation containing a sufficient amount of active ingredient to obtain the desired rate of active ingredient per acre.

The seed-containing pans are placed on a sand bench and maintained under ordinary conditions of sunlight and watering. The plants are observed at the end of approximately 14 days and the results recorded. The herbicidal activity index is based on the average percent control of each seed lot. The herbicidal activity index is converted to a relative numerical scale for the sake of brevity and simplicity in the table.

The pre-emergent herbicidal activity index used is defined as follows:

| Average Percent Control | Numerical Scale |
|---|---|
| 0 to 25 | 0 |
| 26 to 50 | 1 |
| 51 to 75 | 2 |
| 76 to 100 | 3 |

In Table I, below, the dosage rate, the spectrum of plant seeds treated, and the results of tests carried out according to the above procedure are indicated for several of the compounds of this invention.

TABLE I

| Compound | Dosage, lb./acre | Morning glory | Wild oat | Brome grass | Rye grass | Radish | Sugar beets | Foxtail | Crab grass | Pig-weed | Soy-bean | Wild buckwheat | Tomato | Sorghum |
|---|---|---|---|---|---|---|---|---|---|---|---|---|---|---|
| A | 10 | 0 | 0 | 1 | 1 | 0 | 1 | 2 | 3 | 3 | 1 | 1 | 0 | 2 |
| B | 10 | 0 | 0 | 0 | 1 | 1 | 1 | 2 | 1 | 3 | 0 | 1 | 0 | 1 |
| C | 10 | 0 | 1 | 0 | 1 | 0 | 0 | | 2 | 2 | 0 | 2 | 1 | 1 |

A = N-(alpha,alpha,alpha-trichloroacetimidoyl)benzenesulfonamide
B = N-(alpha,alpha,alpha-trichloroacetimidoyl)-p-toluenesulfonamide
C = N-acetimidoylbenzenesulfonamide

POST-EMERGENT ACTIVITY

In a post-emergent herbicidal test, the active ingredients in each case are applied in spray form to 14-day or 21-day old specimens of the plants (species indicated hereinafter). The herbicidal sprays are acetone-water solutions containing surface active agent and varying amounts of the active ingredient. The solutions are applied to the plants in different pans at rates equal to the desired rate of active ingredient on a per care basis. The treated plants are placed in a greenhouse and the effects are observed and recorded after approximately 14 days.

The post-emergent herbicidal activity index used in this example is defined as follows:

| Numerical Scale | Herbicidal Activity |
|---|---|
| 0 | No phytotoxicity |
| 1 | Slight phytotoxicity |

| 2 | Moderate phytotoxicity |
| 3 | Severe phytotoxicity |
| 4 | Plants dead |

In Table II the dosage rate, the spectrum of treated and the results carried out according to the above procedure are indicated for illustrative compounds of this invention.

| 2. | Powdery dusts | 2 to 90% |
| 3. | Wettable powders | 2 to 90% |
| 4. | Emulsifiable concentrates | 5 to 95% |
| 5. | Solutions | 0.01 to 95% |
| 6. | One of the less common types of formulations depending on the desired mode of application | 0.01 to 95% |

TABLE II

| Compound | Concentration (percent) | Morning glory | Wild oat | Brome grass | Rye grass | Radish | Sugar beets | Crab grass | Pigweed | Soybean | Wild buckwheat | Tomato | Sorghum |
| --- | --- | --- | --- | --- | --- | --- | --- | --- | --- | --- | --- | --- | --- |
| D | 0.5 | 1 | 0 | 0 | 0 | 2 | 3 | 2 | 4 | 2 | 3 | 2 | 1 |
| E | 0.5 | 0 | 0 | 0 | 0 | 1 | 3 | 1 | 3 | 0 | 2 | 2 | 1 |

A concentration of 0.5 percent is equal to a dosage rate of about 9–10 lbs./acre.

D = N-acetimidoyl-3,4-dichlorobenzenesulfonamide
E = N-(alpha,alpha,alpha-trichloroacetimidoyl)-3,4-dichlorobenzenesulfonamide The active ingredients hereindefined are suitable for both pre-emergent and post-emergent plant application. That is, they are effective in controlling the growth of germinant seeds, emerging seedlings and established vegetation by exposing the seeds, emerging seedlings, or the roots or above-ground portions to the action of an effective amount of one or more of these herbicidally active compounds.

In foliar treatment for the modification of vegetative growth, the active ingredients are applied in amounts from about 0.1 to about 50 or more pounds per acre, preferably about 0.1 to 15 pounds per acre in foliar treatments. In soil applications, it is desirable that the active ingredients be distributed to a depth of at least 0.2 inches. In pre-emergence herbicidal applications the active ingredients are usually applied in amounts from about 0.1 to 25 pounds per acre but preferably from about 0.1 to 10 pounds per acre. It is believed that one skilled in the art can readily determine from the teachings of this specification, including examples, the procedure for any particular desired application.

In using the compounds of this invention, the active ingredients can be used alone or in combination with a material referred to in the art as an adjuvant in liquid or solid form. The usual purpose of adjuvants is to facilitate application of the herbicidal composition and to obtain the desired dosage rate. Herbicidal formulations are prepared by admixing the active ingredient with one or more adjuvants which includes diluents, extenders, carriers and conditioning agents to provide compositions in the form of finely divided particulate solids, granules, pellets, solutions, dispersions or emulsions. Thus, the active ingredient can be used with an adjuvant such as a finely divided particulate solid, a liquid of organic origin, water, a wetting agent, dispersing agent, an emulsifying agent or any suitable combination of these.

Suitable adjuvants of the foregoing types are not here defined in detail as to composition, particle size, relative amounts etc. since they are well known in the art.

In general, the active ingredients may be formulated with the active ingredient in minor or major proportions in accordance with the table below:

| Type of Formulation | Concentration of Active Ingredient |
| --- | --- |
| 1. Granules of relatively large particle size | 5 to 50% |

In addition to adjuvants the compounds of this invention can be used in combination with fertilizers and/or other pesticides such as insecticides, fungicides, nematocides, and/or other phytotoxicants inclusive of herbicides, and the like.

Having now described the invention, many ramifications and modified embodiments will readily occur to those skilled in the art. In so far as such variations do not depart from the spirit and scope of the invention described in this application, they are intended to be embraced by the appended claims in their broadest construction.

What is claimed is:

1. Compound of the formula

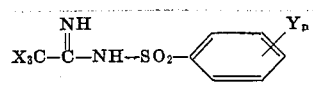

where X is halogen, with the proviso that X cannot represent more than one iodine; Y is independently selected from hydrogen, halogen, alkyl of not more than 12 carbon atoms, haloalkyl of not more than 12 carbon atoms with not more than 3 halogens therein in the 1- and 2-position, and alkoxy of not more than five carbon atoms, and $n$ is an integer of 1 through 5.

2. Compound according to claim 1 wherein $n$ is an integer of 1 through 3, inclusively.

3. Compound according to claim 1 wherein Y is hydrogen.

4. Compound according to claim 2 wherein Y is alkyl.

5. Compound according to claim 2 wherein Y is haloalkyl.

6. Compound according to claim 4 wherein said alkyl has no more than four carbon atoms therein.

7. Compound according to claim 5 wherein said haloalkyl has no more than four carbon atoms therein.

8. Compound according to claim 7 wherein the halo of said haloalkyl is chlorine.

9. Compound according to claim 1 wherein X is chlorine.

10. Compound according to claim 1 wherein said compound is N-(alpha,alpha,alpha-trichloroacetimidoyl)-benzenesulfonamide.

11. Compound according to claim 1 wherein said compound is N-(alpha,alpha,alpha-trichloroacetimidoyl)-p-toluenesulfonamide.

12. Compound according to claim 1 wherein said compound is N-(alpha,alpha,alpha-trichloroacetimidoyl)-3,4-dichlorobenzenesulfonamide.

* * * * *